No. 851,085. PATENTED APR. 23, 1907.
S. H. GARST.
HARROW.
APPLICATION FILED MAY 4, 1906.
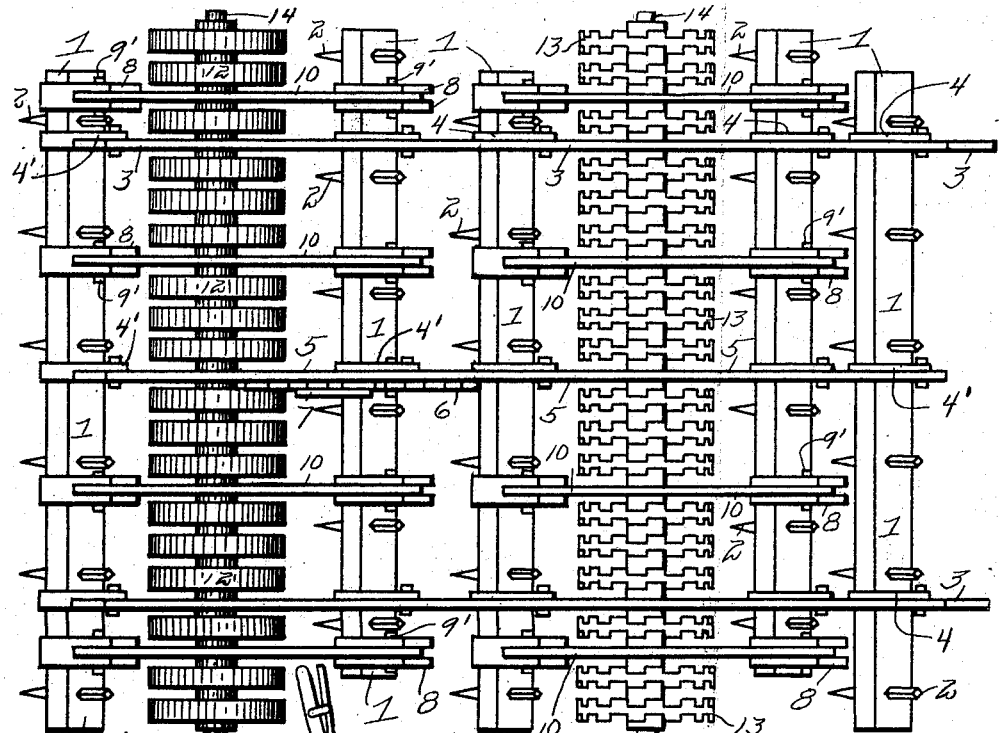
Fig. 1.
Fig. 3.
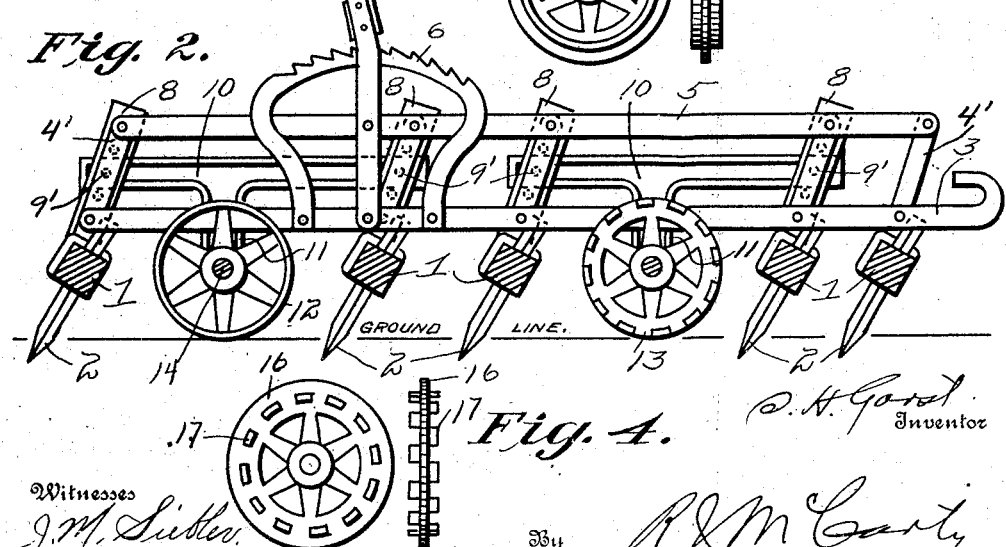
Fig. 2.
Fig. 4.

UNITED STATES PATENT OFFICE.

STEPHEN H. GARST, OF DETROIT, MICHIGAN.

HARROW.

No. 851,085.　　　Specification of Letters Patent.　　Patented April 23, 1907.

Application filed May 4, 1906. Serial No. 315,208.

*To all whom it may concern:*

Be it known that I, STEPHEN H. GARST, a citizen of the United States, residing at Detroit, in the county of Wayne and State of Michigan, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in harrows, and said improvements are applicable to any of the well known forms of harrows, such for example, as the spring-tooth drag or harrow, or the spike-tooth harrow, or the improvements may be utilized in connection with cultivators which employ any of the well known means for turning up the soil, such for example, as shovels, or disk cutters.

The object of the invention is to provide a multiplicity of small rollers or revolving crushers which are spaced a short distance apart and by their form and shape present many cutting edges to the soil. These small rollers are suspended in the harrow frame in a manner which enables the lower sides of said rollers to lie above the points of the harrow teeth. In other words, the teeth and rollers are so arranged that when the teeth are straightened up to cause them to penetrate deeper into the soil, the rollers are raised higher from the surface, and as the teeth are given a more slanting position, which causes them to run shallow, the rollers move forward and downward. With this arrangement the clods of earth which lie upon the surface of the ground in the path-way of the rollers are all that come in contact with the rollers, so that the rollers will crush the clods without coming in contact with the general surface of the ground, and the said clods will be readily pulverized without packing down the soft ground underneath. This being the case, the soil can be worked with this machine without injury when it contains more moisture than is commonly the case. The advantage of this lies in the fact that the soil can be pulverized and fitted for planting much earlier and with less labor. The tendency of the rollers is not to roll over and pack the clods in the soil, but the action is more in the nature of pushing against the clods, pulverizing them by cutting, crushing and grinding. This causes the harrow to pulverize on the surface without packing the soil underneath. The pulverizing devices being located within the body of the harrow and followed by cultivating devices, the ground is left in a fine loose state to receive the benefits from exposure to air and sunshine.

The drawings illustrate a common form of harrow to which my improvements are applied.

Figure 1, is a plan view showing a harrow with five gangs of spike teeth with two intervening gangs of revolving crushers. Fig. 2, is a side elevation showing the tooth bars in section. Figs. 3 and 4, are detailed illustrations of special forms of revolving crushers or wheels which I consider preferable owing to the structural features which especially adapt them for the work of crushing and leveling the clods turned up by the teeth.

In a detail description of the invention, similar reference characters indicate corresponding parts.

1 designates a series of cultivator bars each of which supports a plurality of spikes or cultivator teeth 2, said teeth being rigidly maintained within the bars and adapted to engage the soil in the operations of the machine. These cultivator bars 1 are connected to parallel horizontal bars 3 by means of standards 4 which are rigidly connected to the bars 1 and are pivotally connected to the parallel bars 3. Connected to the midddle parallel bar by means of standards 4' is an upper parallel bar 5.

Rigidly connected to the central parallel bar 3 is a rack 6 engaged by a ratchet-pawl carried upon a hand-operating lever 7, said lever being connected with the upper and lower parallel bars 5 and 3. Through this form of lever attachment which is old and well known, the tooth bars 1 may be operated to any desired position to bring the cultivator teeth 2 on the proper angle. Secured to the cultivator bars 1 are a series of standards 8; these standards are shaped at their lower ends to properly receive the cultivator bars 1 and are provided with a series of adjusting holes 9　Supported in said standards 8 are brackets or T bars 10 with centrally-depending hangers 11 which provide supports for the gangs of revolving crushers or wheels 12 and 13. The brackets 10 are adjustably supported in the standards 8 at any suitable elevation by means of pins 9' which penetrate the openings 9 in said standards and similar openings in the brackets. By means of the adjustable connection between the hanger bars or brackets 10 and the standards 8, the gangs of individual revolving crushers 13 may be placed in the desired position relatively to the points or the ends of the cultivator teeth. The preferred position of the rollers or crushers is such that when the cultivator teeth are straightened or moved to more vertical positions to cause them to penetrate deeper into the soil, the rollers are raised from the surface of the soil, and when the cultivator teeth are moved to a slanting position, the said rollers are caused to move forward and downward; the result of this is that the rollers will crush the clods without coming in contact with the surface of the ground. The gangs of wheels or revolving crushers 12 and 13 are supported upon axles 14 in the hangers 11 and are subjected to a limited movement from the operating lever 7 when the tooth or cultivator bars 1 are manipulated. Any style of revolving crusher or wheel may be adapted for the purposes of crushing and leveling the clods or lumps of earth turned up by the earth-penetrating elements of the machine; but Figs. 3 and 4 show preferred forms of wheels or crushers; one of these has a solid face with a central-annularly-disposed splitting ridge or rib 15 projecting from the face of the wheel, the effect of which is to penetrate the clods or lumps of earth immediately upon contact therewith, and to crumble the same preparatory to the contact of the flat or smooth surface of the wheel rim. The other form of revolving crusher or wheel shows the rim on each side of a central-annularly disposed ridge 16, constructed in the form of a series of teeth 17 with intervening notches; the purpose of this form of construction is to likewise initially disintegrate the solid lumps or clods of earth and disperse the same as the revolving crusher moves over said clods or lumps.

The connections between the upright standards 8 and the brackets 10 are flexible in their nature so that when the hand lever 7 is operated backward or forward, the row of revolving crushers or wheels will have a limited simultaneous movement with the tooth bars 1 of the harrow; for example, when the lever is moved forward, the tooth bars 1 are rocked so that the teeth therein will occupy a rearward slanting position, as shown in Fig. 2. As the lever is moved further forward, the teeth assume more of the slanting position and the revolving crushers move forward and downward. When the lever is moved backward the teeth straighten or assume substantial vertical positions and the revolving crushers move upward and backward. When the teeth are thus straightened, they are caused to penetrate the soil to the greatest extent, and as the revolving crushers are at their highest point when the teeth are in their upright positions, it will be seen that the harrow teeth and the revolving crushers move and work in perfect accord; in other words, as the teeth slant and cut shallow, the revolving crushers lower, and as said teeth are straightened up and caused to penetrate the soil deeper, the said revolving crushers are raised. There is thus combined in a single machine means for simultaneously cultivating the soil, and for reducing the upturned clods or lumps to a pulverized or disintegrated form in one operation, and while said clods or lumps are green or soft. One or more rows of teeth being in the lead, will level and cut the soil to a certain extent, but when followed by the adjacent row of revolving crushers, the clods or lumps will be crushed and leveled off completely. One or more rows of teeth or shovels following this row of revolving crushers will further reduce and crush any remaining lumps or clods to the desired fineness. The revolving crushers follow directly behind the teeth and crush the earth while it is fresh. In a spike tooth harrow, such as is here shown, the desired depth of the teeth in the soil may be regulated as before stated by slanting the teeth backward, but the machine necessarily always rides on the point of the teeth and thus produces a tendency to wear off the points. When this condition arises, the effectiveness of the machine as a pulverizer becomes greatly impaired. This difficulty is overcome to a material extent by the application of the revolving crushers.

I claim:

1. In a harrow, a series of harrow teeth supported upon parallel bars, in combination with gangs of individual revolving crushers moving in the paths of the harrow teeth, adjustable brackets upon which said gangs of revolving crushers are mounted, said brackets being adjustably mounted in the harrow frame in the rear of the harrow teeth, and a common operating lever with connections which enable a simultaneous manipulation of the harrow teeth and the revolving crushers, whereby when the harrow teeth are moved to a substantially vertical position to cause said teeth to penetrate the soil deeper, the said revolving crushers are raised from the surface of the soil, and as said harrow teeth are moved to a substantially slanting position, the said revolving crushers are moved downward and forward, substantially as specified.

2. In a harrow, the combination with gangs of harrow teeth, of gangs of revolving crushers moving in the paths of said harrow teeth, said gangs of revolving crushers having adjustable connections in the harrow frame by means of brackets with depending standards, and a common operating lever with connections with the harrow frame and whereby the harrow teeth and the revolving crushers are simultaneously manipulated to cause said harrow teeth and revolving crushers to move in substantially opposite directions, as herein described.

In testimony whereof I affix my signature, in presence of two witnesses.

STEPHEN H. GARST.

Witnesses:
S. E. GARST,
H. BURGIS.